(12) United States Patent
Kirkpatrick (10) Patent No.: US 9,805,410 B2
(45) Date of Patent: Oct. 31, 2017

(54) SEAMLESS TRANSITION FROM SAMPLE TO FULL VERSION OF DIGITAL CONTENT

(71) Applicant: Google Inc., Mountain View, CA (US)

(72) Inventor: Ficus Kirkpatrick, Los Altos, CA (US)

(73) Assignee: Google Inc., Mountain View, CA (US)

( * ) Notice: Subject to any disclaimer, the term of this patent is extended or adjusted under 35 U.S.C. 154(b) by 779 days.

(21) Appl. No.: 13/778,097

(22) Filed: Feb. 26, 2013

(65) Prior Publication Data
US 2014/0214578 A1 Jul. 31, 2014

Related U.S. Application Data

(60) Provisional application No. 61/759,233, filed on Jan. 31, 2013.

(51) Int. Cl.
*G06Q 30/06* (2012.01)
*G06Q 30/02* (2012.01)

(52) U.S. Cl.
CPC ..... *G06Q 30/0641* (2013.01); *G06Q 30/0253* (2013.01); *G06Q 30/0254* (2013.01); *G06Q 30/0276* (2013.01); *G06Q 30/0601* (2013.01); *G06Q 30/0639* (2013.01)

(58) Field of Classification Search
CPC ........... G06Q 30/0639; G06Q 30/0253; G06Q 30/0254; G06Q 30/0276; G06Q 30/0623
USPC ...................................................... 705/26.9
See application file for complete search history.

(56) References Cited

U.S. PATENT DOCUMENTS

| 8,190,674 B2 * | 5/2012 | Narayanan | G06F 15/16 370/229 |
| 8,699,707 B1 * | 4/2014 | Brunsman | G08B 21/0288 380/239 |
| 8,725,565 B1 * | 5/2014 | Ryan | G06Q 30/0269 705/14.4 |

(Continued)

FOREIGN PATENT DOCUMENTS

CN 102804182 A 11/2012
KR 10-2009-0073604 A 7/2009

OTHER PUBLICATIONS

Amazon.com, "Wish list" 1 Page [online] [Retrieved on May 22, 2013] Retrieved from the internet <URL:http://www.amazon.com/wishlist/>.

(Continued)

*Primary Examiner* — Mamon Obeid
*Assistant Examiner* — Edgar R Martinez-Hernandez
(74) *Attorney, Agent, or Firm* — Shumaker & Sieffert, P.A.

(57) ABSTRACT

A client (e.g., an eReader) receives and displays a sample version of content to a user retrieved from a store server. The sample version is a subset of the full version of the content. The client determines a location in the sample content in which to insert a buy page that allows the user to purchase the full version. The buy page may be inserted at a location that minimizes the time the user spends waiting for the full version to be installed on the client. The client uses one or more locating factors to determine the location. The user may interact with the buy page inserted at the determined location to purchase the full version of the content. The client interacts with the store server to conduct the purchase transaction, and seamlessly transitions the user from the sample to the full version of the content.

14 Claims, 6 Drawing Sheets

(56) References Cited

U.S. PATENT DOCUMENTS

| | | | | |
|---|---|---|---|---|
| 2001/0007980 | A1* | 7/2001 | Ishibashi | G06F 1/1626 705/14.4 |
| 2010/0094726 | A1* | 4/2010 | Tuli | G06Q 30/0601 705/26.1 |
| 2010/0158101 | A1* | 6/2010 | Wu | H04N 21/23424 375/240.01 |
| 2010/0279766 | A1* | 11/2010 | Pliska | H04N 7/163 463/29 |
| 2012/0096094 | A1* | 4/2012 | So | G06F 17/30017 709/206 |
| 2012/0102395 | A1* | 4/2012 | Cho | G06F 15/0291 715/253 |
| 2012/0123889 | A1 | 5/2012 | Mosquera | |
| 2012/0154372 | A1* | 6/2012 | Buck | G06F 17/30017 345/418 |
| 2012/0200573 | A1* | 8/2012 | Stoner | G09B 5/02 345/472 |
| 2012/0204092 | A1* | 8/2012 | Stoner | G06F 3/0483 715/234 |
| 2012/0233565 | A1 | 9/2012 | Grant | |
| 2012/0311438 | A1* | 12/2012 | Cranfill | G06F 17/30011 715/256 |
| 2013/0060661 | A1* | 3/2013 | Block | G06F 21/10 705/26.44 |
| 2013/0254056 | A1* | 9/2013 | Fujimori | G06Q 30/06 705/26.1 |
| 2013/0263053 | A1* | 10/2013 | Tritschler | G06F 9/4443 715/835 |
| 2014/0164915 | A1* | 6/2014 | Liu | G06F 17/211 715/249 |
| 2014/0167686 | A1* | 6/2014 | Raduchel | H04L 67/303 320/107 |
| 2014/0250219 | A1* | 9/2014 | Hwang | G06F 17/2827 709/224 |
| 2014/0298486 | A1* | 10/2014 | Robertson | G06F 21/10 726/28 |

OTHER PUBLICATIONS

Amazon.com, "Help—Shopping for Kindle Content," 10 Pages [online] [Retrieved on May 22, 2013] Retrieved from the internet <URL:http://www.amazon.com/gp/help/customer/display.html?nodeId=200375550>.

Hubpages, Inc., "Amazon Kindle Free Samples," Last updated Dec. 28, 2008, 3 Pages [online] [Retrieved on May 22, 2013] Retrieved from the Internet <URL:http://mortaine.hubpages.com/hub/Amazon-Kindle-Free-Samples>.

Jacobs, A., "Will Kindle's Free Samples Change the Structures of Plots?" The Atlantic, Mar. 21, 2012, 5 Pages [online] [Retrieved on May 22, 2013] Retrieved from the Internet <URL:http://www.theatlantic.com/technology/archive/2012/03/will-kindles-free-samples-change-the-structures-of-plots/254835/>.

Moyes, J., "How e-books made reading sexy again," The Telegraph, Mar. 13, 2012, 4 Pages [online] [retrieved on May 22, 2013] Retrieved from the internet <URL:http://www.telegraph.co.uk/culture/books/9138908/How-e-books-made-reading-sexy-again.html>.

Provisional Patent Application filed for U.S. Appl. No. 61/350,965, filed Jun. 3, 2010, 61 Pages.

PCT International Search Report and Written Opinion for PCT/US2014/010323, Apr. 24, 2014, 9 Pages.

Extended European Search Report for European Patent Application No. EP 14746553.8, Jul. 14, 2016, 8 Pages.

First Office Action, and translation thereof, from counterpart Chinese Application No. 201480006774.3, dated Jun. 2, 2017, 17 pp.

* cited by examiner

SEAMLESS TRANSITION FROM SAMPLE TO FULL VERSION OF DIGITAL CONTENT

CROSS REFERENCE TO RELATED APPLICATIONS

This application claims the benefit of U.S. Provisional Application No. 61/759,233, filed Jan. 31, 2013, which is incorporated by reference in its entirety.

BACKGROUND

1. Field of the Invention

This invention pertains in general to e-books and other digital content and in particular to transitioning from a sample of digital content to a full version of the content.

2. Description of the Related Art

Electronic books (e-books) have become commonplace in recent years. Users use electronic devices such as dedicated electronic readers (e-readers), tablet computers, and smart phones to read the e-books. In addition, users may use the same devices to consume other types of digital content. Oftentimes, a user's device maintains a library of digital content available to the user. For example, the device may maintain a library containing e-books, movies, and music. The user can select particular content from the library, such as a particular e-book, and then read or otherwise consume the content using the device.

Many content providers offer free samples of digital content to entice users to buy the full version of the content. For example, an e-book publisher may provide the first chapter or two of an e-book as a free sample so that users can be drawn into the story or other content. The users are provided with an option to buy the full version of the content so that a user who enjoys the sample can easily purchase the full version.

The approach described above has several drawbacks that may inconvenience users purchasing full versions of digital content and detract from the user's experience. For instance, the user may need to exit the content to purchase the full version. Thus, if a user is reading a free sample of an e-book and decides to purchase the full version of the book, the user may need to leave the text of the e-book to interact with the store. Additionally, the user's device may treat the full version of the digital content as separate from the sample version. As a result, the user's library may be cluttered with both the sample and the full versions after the purchase of the full version. The user may also need to manually open the full version of the content and navigate to the reading position where the user left off in the sample (i.e., to the end of the sample). The user may also need to wait to purchase the full version if the user's device has a slow or unreliable network connection to the online store.

SUMMARY

The above and other needs are met by methods, computer-readable storage media, and devices for transitioning from a sample version of digital content to a full version of the content.

One aspect provides a computer-implemented method for transitioning from a sample version of digital content to a full version of the content. The method includes operation steps of displaying the sample version the content to a user of a client, wherein the sample version of the content is a subset of the full version of the client, determining a location in the sample version of the content to insert a buy page that lets the user purchase the full version of the content, inserting the buy page at the determined location in the sample version of the content, and responsive to the user purchasing the full version of the content, seamlessly transitioning from the sample version of the content to the full version of the content.

Another aspect provides a non-transitory computer-readable storage medium storing executable computer program instructions for transitioning from a sample version of digital content to a full version of the content. The computer-readable storage medium stores computer program instructions for displaying the sample version the content to a user of a client, wherein the sample version of the content is a subset of the full version of the client, for determining a location in the sample version of the content to insert a buy page that lets the user purchase the full version of the content, and for inserting the buy page at the determined location in the sample version of the content. The computer-readable storage medium further stores computer program instructions for, responsive to the user purchasing the full version of the content, seamlessly transitioning from the sample version of the content to the full version of the content Still another aspect provides a device for transitioning from a sample version of digital content to a full version of the content. The device includes a computer processor for executing computer modules, including a displaying module, a location module, an insertion module and a transition module. The displaying module is for displaying the sample version of the content to a user of a client, wherein the sample version of the content is a subset of the full version of the content. The location modules is for determining a location in the sample version of the content to insert a buy page that lets the user purchase the full version of the content. The insertion module is for inserting the buy page at the determined location in the sample version of the content. The transition module is for, responsive to the user purchasing the full version of the content, seamlessly transitioning from the sample version of the content to the full version of the content.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
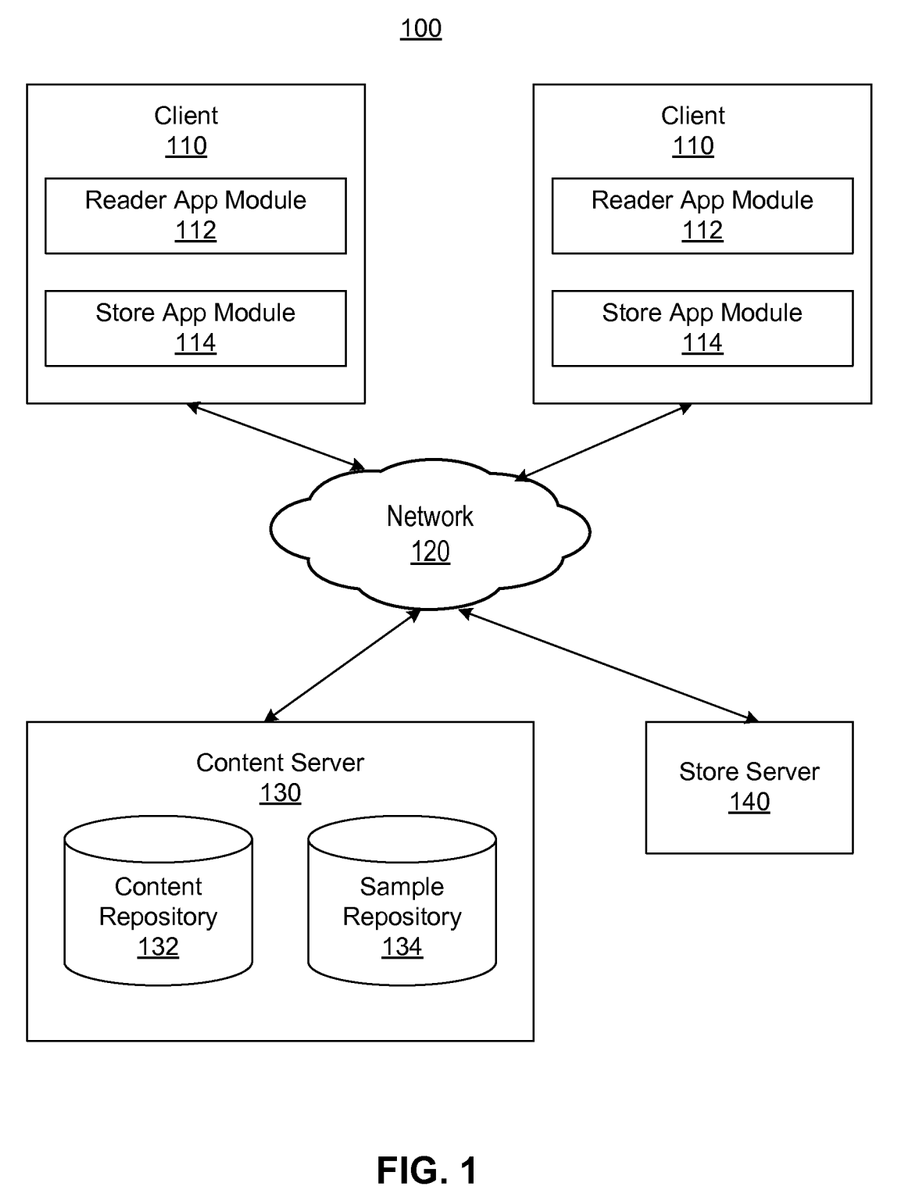
FIG. 1 is a high-level block diagram of a computing environment supporting seamless transitioning from samples of digital content to the full versions of the content according to one embodiment.

FIG. 1 is a high-level block diagram of a computing environment 100 supporting seamless transitioning from samples of digital content to the full versions of the content according to one embodiment. In this disclosure, "digital content" generally refers to any machine-readable and machine-storable work product, such as e-books, videos, and music files. In one embodiment, the computing environment 100 supports seamless transitions from the text in samples of e-books to the text of full versions of the e-books. Hence, the following discussion often focuses on e-books. However, the techniques described below can also be used with other types of digital content.

FIG. 1 illustrates a content server 130, a store server 140 and two clients 110 connected by a network 120. Only two clients 110, one content server 130, and one store server 140 are shown in FIG. 1 in order to simplify and clarify the description. Embodiments of the computing environment 100 can have many clients 110, content servers 130, and store servers 140 connected to the network 120. Likewise, the functions performed by the various entities of FIG. 1 may differ in different embodiments.

A client 110 is an electronic device used by a user to perform functions such as consuming digital content, executing software applications, browsing websites hosted by web servers on the network 120, downloading files, and interacting with the book 130 and store servers 140. For example, the client may be a dedicated e-reader, a smart phone, or a tablet, notebook, or desktop computer. The client 110 includes a display device on which the user may view the text of e-books and other digital content. In addition, the client 110 includes a user interface (UI), such as physical and/or on-screen buttons, with which the user may interact with the client to perform functions such as consuming content, selecting content, obtaining samples of content, and purchasing content.

The client 110 executes a reader application module 112 and a store application module 114. The reader application module 112 maintains a library of digital content and enables the user to consume the content, such as by displaying the text of an e-book on the display of the client 100. The store application module 114, in turn, enables the user to obtain e-books and other digital content via the network 120 and store the content in the library. For example, the user can use the store application module 114 to obtain sample and full versions of e-books. Depending upon the embodiment, the reader application module 112 and store application module 114 may be standalone applications or integrated into the operating system or other software executing on the client 110.

The reader application module 112 interacts with the store application module 114 to support a seamless transition from the sample of digital content to the full version of the content. "Seamless," in this context, refers to a consistent and continuous transition from the free to the full version of the content, such that the transition is essentially unnoticeable by the user. The seamless transition may involve replacing the sample version of content with the full version of the content, and displaying the full version of the content to the user starting from the same content in the sample version that the user is currently consuming when the transition occurs. For example, if the digital content is an e-book, a seamless transition occurs when the full version of the content replaces the free version in the user's library, and the user's reading position in the full version is set to the same reading position of the user in the sample content at the time of the transition. Thus, the user is switched from the sample version to the full version without any interruption in the user's reading experience.

In one embodiment, the reader application module 112 inserts a synthetic "buy" page into the sample content. The user can interact with the buy page to purchase the associated full version of the content. The location at which the buy page is inserted into the sample may vary. In one embodiment, the reader application module 112 inserts the buy page at a location that minimizes time the user spends waiting for the full content to be installed on the client 110. For example, the buy page may be inserted into an e-book several pages before the end of the sample content, so that the full versions of the content can be installed on the client 110 in the background while the user continues to read the sample content. Thus, by the time the user reaches the end of the sample content, the full version of the content is available on the client 110 and the reader application module 112 can seamlessly transition the user to the full content.

In one embodiment, the user selects a "buy" button on the buy page which activates the store application module 114. The store application module 114 interacts with the user to obtain identification, payment, and/or other purchase information from the user and performs the purchase transaction for the full version of the content. Upon receiving purchase information from the reader application module 112, the store application module 114 may transmit the purchase information to the store server 140 to perform the purchase. After the purchase, the store application module 114 interacts with the reader application module 112 to cause the full version of the content to be installed in the user's library and seamlessly transition the user to the full version.

The content server 130 stores digital content and interacts with the reader application modules 112 of the clients 110 via the network 120 to provide the digital content to the clients. In one embodiment, the content server 130 stores a large amount of digital content from multiple publishers and distributors. The digital content may include e-books as well as other types of content such as movies and music.

In one embodiment, the content server 130 includes a content repository 132 storing full versions of content and a sample repository 134 storing samples of the full content. For example, the content repository 132 may store full versions of e-books while the sample repository 134 stores e-book samples associated with the full versions. Generally, a sample of digital content includes a subset of the content within the associated full version of the content, such as the first chapter of an e-book. Samples of digital content may be given to users by e-book publishers or distributors for free to entice the users to buy the full versions.

In one embodiment, the digital content in the content repository 130, including the content in the content repository 132 and in the sample repository 134, is stored as a set of files and associated metadata. Each file is associated with particular content, such as a given e-book, and a single unit of content may be formed of one or more associated files. The metadata for the files describe attributes of the content with which the files are associated. In one embodiment, the metadata include a volume identifier (ID) that is a string that uniquely identifies a given unit of content (e.g., an e-book). In addition, the metadata include an "offer type" flag that distinguishes between full versions and sample versions of content. The metadata may also describe, for example, the title, author, publisher, and classification of the content.

In one embodiment, the metadata of the full versions of the content in the content repository 132 and the metadata of the associated sample versions of the content in the sample repository 134 are substantially the same. Thus, the sample version of an e-book has the same volume ID as the full version of the book. However, the offer type flag of the metadata is set to different values depending upon whether a given file pertains to the full version or a sample version of the content.

The store server 140 interacts with the store application modules 114 of the clients 110 and the content server 130 that provides digital content to the clients. The store server 140 may provide an online storefront that the user can browse using the client 110 to identify and obtain e-books and other content. For example, the storefront may allow users to purchase full and sample versions of content. The sample versions may be free or have a lower price than the full versions of the content.

The store server 140 also interacts with the store application modules 114 of the clients to process purchases of the full versions of content. In this instance, the store server 140 receives and verifies purchase information received from the store application module 114 of a client 110. In one embodiment, the store server 140 maintains content libraries describing the content owned by users of the clients 110. The store server 140 accordingly updates its content library for a user to reflect that the user of the client has purchased the full version. The store server 140 also interacts with the content server 130 to cause it to provide the full version of the purchased content to the client 110.

The network 120 enables communications among the clients 110, the content server 130 and the store server 140 and can comprise the Internet as well as mobile telephone networks. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
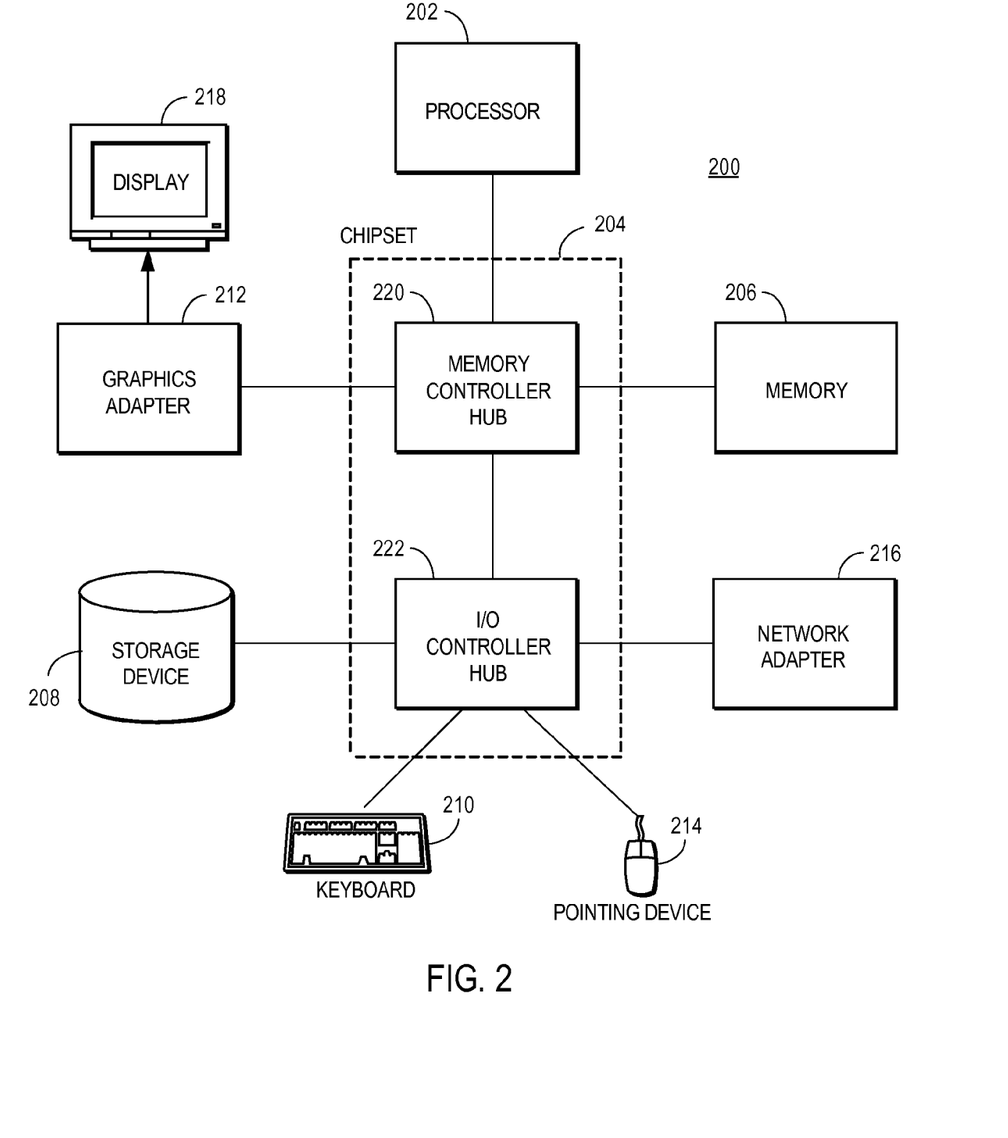
FIG. 2 is a high-level block diagram of a computer for acting as a client, the content server and/or store server in one embodiment.

FIG. 2 is a high-level block diagram of a computer 200 for acting as a client 110, the content server 130 and/or store server 140 in one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the content 130 and/or store 140 servers can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
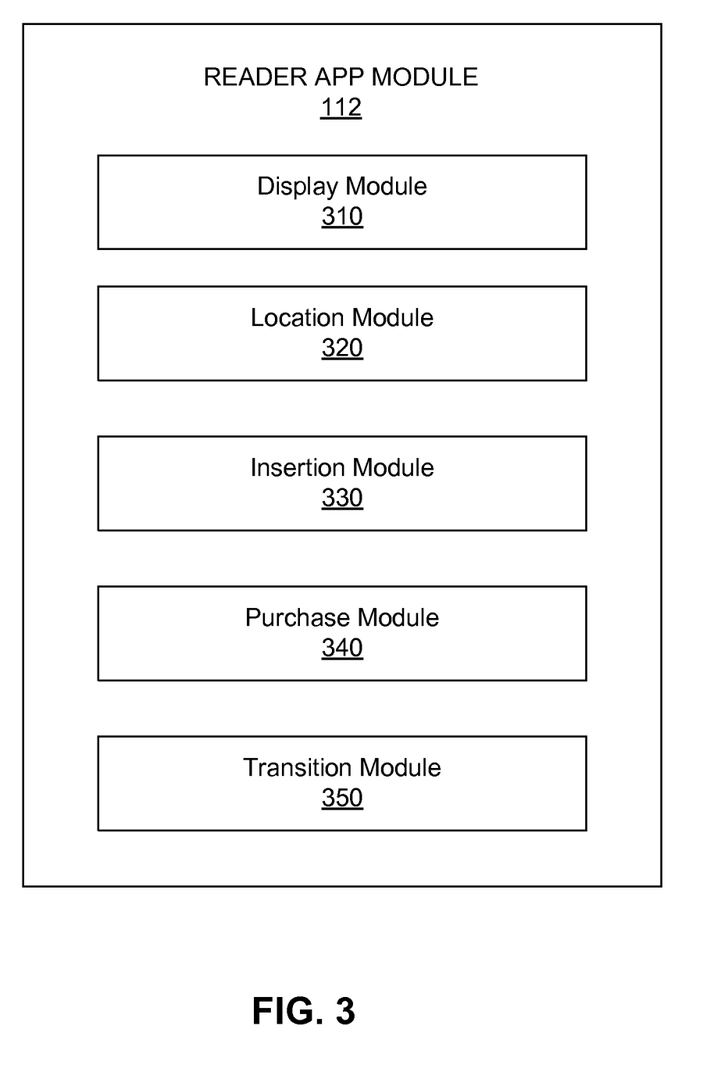
FIG. 3 is a high-level block diagram illustrating a detailed view of the reader application module of a client according to one embodiment.

FIG. 3 is a high-level block diagram illustrating a detailed view of the reader application module 112 of a client 110 according to one embodiment. As shown in FIG. 3, the reader application module 112 includes a display module 310, a location module 320, an insertion module 330, a purchase module 340 and a transition module 350. Those of skill in the art will recognize that other embodiments of the reader application module 112 can have different and/or other modules than the ones described here, and that the functionalities can be distributed among the modules in a different manner.

The display module 310 displays digital content on the display device of the client 110. In one embodiment, the display module 310 displays pages of e-book text on the display device. The display module 310 also displays the synthetic buy page inserted into the content as described above. In addition, the display module 310 displays UI elements, such as controls that allow the user to select and obtain content, input purchase information, and the like.

The location module 320 determines a location in sample content at which to insert the synthetic buy page that lets the user purchase the full version of the content. As mentioned above, in one embodiment the buy page is inserted at a location that minimizes the time the user spends waiting for the full version of the content to be installed on the client 110. This minimization can be achieved by inserting the buy page at a location before the end of the sample content, so that the user can purchase the full version of the content and then continue to read the sample content (which is already installed on the client 110) while the full version is downloaded from the content server 130 to the client. Once the full version is downloaded, the user can be seamlessly transitioned from the sample version to the full version so that the user's reading experience is uninterrupted.

The location module 320 may use a variety of locating factors to determine the location at which to insert the buy page into the sample content. The locating factors may include the user's rate of consumption of the content (e.g., the user's reading speed), characteristics of the client (e.g., the bandwidth of the client's network connection), and characteristics of the digital content (e.g., the size of the file or files associated with the full version of the content). In one embodiment, the location module 320 uses the locating factors to determine the amount of time likely required to download the full version of the content to the client. The location module 320 also determines the rate at which the user is consuming the content. Then, the location module 320 selects a location for the buy page in the sample content such that the user will reach the end of the content at approximately the same time, or a specified amount of time after, the full content is downloaded.

In situations in which the servers and devices discussed here collect personal information about a user (e.g., the user's reading speed), or may make use of personal information, the user may be provided with an opportunity to control whether the user information (e.g., information about a user's social network, social actions or activities, profession, a user's preferences, or a user's current location) is collected. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information about the user is collected and used.

For example, if the user is reading a sample e-book on the client 110, the location module 320 interacts with the content server 130 to determine the size (e.g., in bytes) of the file or files containing the corresponding full version of the e-book. The location module 320 also determines the bandwidth (rate of data transfer) of the network connection between the client 110 and the content server 130. Using these values, the location module 320 calculates the approximate amount of time it will take to download the full version of the e-book to the client 110. In addition, the location module 320 determines the speed at which the user is reading the e-book. The location module 320 may determine the reading speed by analyzing the rate at which the user turns the pages of the sample e-book, the user's average reading speed across multiple e-books, an average reading speed across multiple users specified by e-book metadata, and/or using another technique. Then, the location module 320 determines the location in the sample e-book from which the user will finish the sample at approximately the same time the full version of the e-book is downloaded. Thus, if the full version of the e-book will require one minute to download to the client 110, and the user is reading the sample version of the e-book at a rate of 30 seconds per page, the location module 320 may determine that the location at which to insert the buy page is two pages before the end of the sample.

The location module 320 may also determine the location at which to insert the buy page using other techniques. The location module 320 may use the locating factors to determine the location at which to insert the buy page, subject to a predetermined maximum amount of content to hold in reserve for the transition. The location may also be determined independently from the locating factors. For example, the determined location may be at the end of the sample content, at an indicated percentage of the total sample content (e.g., 75% of the way through the sample), or at another place within the content. In addition, the location module 320 may use the locating factors in a different manner than described above. For example, the location module 320 may detect from the user's rate of consumption that the user is consuming the content quickly, and/or during a long reading session and determine to insert the buy page at that time (independent of the length of the sample content) in order to present the buy page to the user during a period of high engagement with the content.

The location module 320 may also determine multiple locations at which to insert the buy page, such as at a location within the sample content and a location at the end of the sample content. In addition, the location module 320 may determine the location of the buy page using combinations of the techniques described herein. Further, the technique used to determine the location of the buy page may be determined by the location module 320 or based on location information specified by the sample content (e.g., by the metadata of the sample content).

The insertion module 330 inserts the buy page into the sample content at the location determined by the location module 320. In one embodiment, the insertion module 330 dynamically generates the buy page when the user reaches the determined location. The insertion module 330 inserts the generated page in a manner that blends it with the actual sample content. Hence, if the sample content is an e-book, the buy page will appear as if it an actual page in the text of the e-book. The buy page is therefore referred to as being "synthetic" because it appears as a real page of the content even though it was dynamically generated and added to the content. In another embodiment, the buy page is presented to the user as a dialog UI (e.g., a pop-up), which invites the user to indicate his/her desire to buy the full version of the content. If the user does not desire to buy the full version of the content, the user may use the UI of the client 110 to move past the buy page and consume any remaining content in the sample.

The buy page or dialog UI contains information and UI elements with which the user can interact to purchase the full version of the content associated with the sample content. For example, the buy page may include information describing the full version of the content. Likewise, the buy page may include a "buy" button the user can select to make the purchase of the full version of the content. The buy page may also include fields into which the user may provide authentication information such as a user ID and password and purchase information such as a credit card number. Some embodiments of the buy page may contain different information or UI elements. For example, the fields into which the user may provide authentication and purchase information might be presented on a separate page that replaces or overlays the buy page when the user indicates a desire to purchase the full version of the content.

If the user selects the buy button, the purchase module 340 interacts with the store application module 114 in the client 110 to process the purchase of the full version of the content. The purchase module 340 may use an application programming interface (API) to activate the store application module 114. Through the API, the purchase module 340 provides the store application module 114 the volume ID of the sample content (which is the same as the volume ID of the full version of the content) and indicates that the store application module 114 should perform a purchase transaction for the content.

In one embodiment, the store application module 114, once activated, presents the user with a purchase page that allows the user to provide authentication and/or purchase information. The store application module 114 collects this information and processes the purchase transaction. This processing may involve sending a purchase notification to the store server 140 that includes the authentication and/or purchase information, along with additional information used for the purchase, such as the volume ID, offer type, and other metadata identifying the purchased content. The store server 140 performs the transaction and communicates the result (e.g., "success" or "fail") to the store application module 114. In turn, the store application module 114 communicates the result of the transaction to the user of the client 110.

The transition module 350 transitions the user of the client 110 from the sample version to the full version of the content responsive to a successful purchase transaction. The transition module 350 receives the full version of the content downloaded from the content server 130 to the client 110. The transition module 350 can receive the downloaded content using a variety of different techniques. In one embodiment, the store server 140, upon processing the successful purchase transaction, instructs the content server 130 to download the content to the client 110. For example, the store server 140 may instruct the content server 130 to engage in a synchronization process with the client 110, which causes the reader application module 112 of the client 112 to synchronize its library of digital content with the library of content owned by the user stored by the store server 140. The client 110 downloads the full version of the content as a result of the synchronization. In another embodiment, the transition module 350 directly downloads the full version of the content from the content server 130 responsive to the successful purchase transaction.

Once the full version of the content is on the client 110, the transition module 350 replaces the sample version of the content at the client with the full version. Again, a variety of techniques may be used to effect this transition. In one embodiment, the transition module 350 saves the full version of the content in the user's library on the client, determines the user's current reading position in the sample version, switches the user to the same reading position in the full version, and deletes the sample version from the user's library. The transition module 350 may switch the user to the full version by instructing the display module 310 to display the full version of the content instead of the sample version. In another embodiment, the transition module 350 overwrites the sample version with the full version of the content, which automatically causes the display module 310 to display the full version of the content when it reads more data from the one or more files embodying the full version.

Regardless of the technique used for the transition, the transition is typically not noticeable to the user. Since the user can read the remaining content in the sample version while the transition to the full version occurs, the user's reading is not interrupted after the user passes the buy page. If the user does exceed the scope of the sample content by, e.g., rapidly paging through the sample content, an embodiment of the transition module displays a "loading" page or other message indicating that the content is being retrieved.

FIGS. 4A-4D illustrate user interfaces showing a seamless sample-to-full version transition according to one embodiment. Each of FIGS. 4A-4D shows the UI of the client 110 at different stages of the transition. At the first stage depicted by FIG. 4A, the UI displays a sample of an e-book and an inserted buy page 410. As mentioned above, the buy page may be inserted at the true end of the sample content or at another location. In the illustrated example, the buy page 410 indicates that it is the end of the sample, but other embodiments of the buy page may present other messages (e.g., "only 5 pages remaining").

Figures 4, 4A:
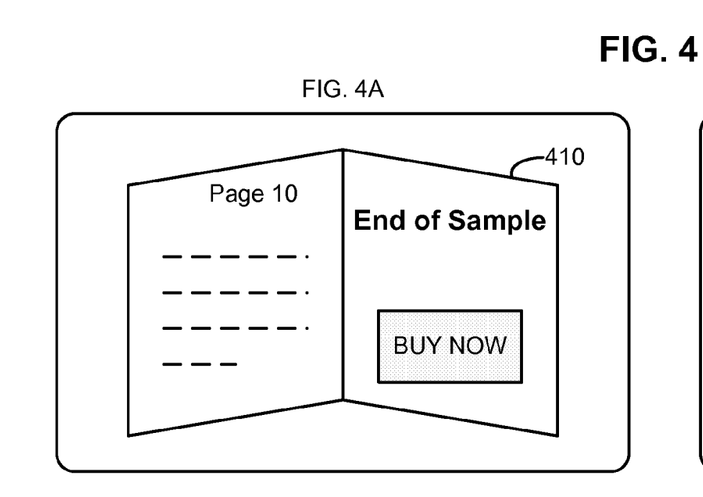
FIGS. 4A-4D illustrate user interfaces showing a seamless sample-to-full version transition according to one embodiment.
Figure 4B:
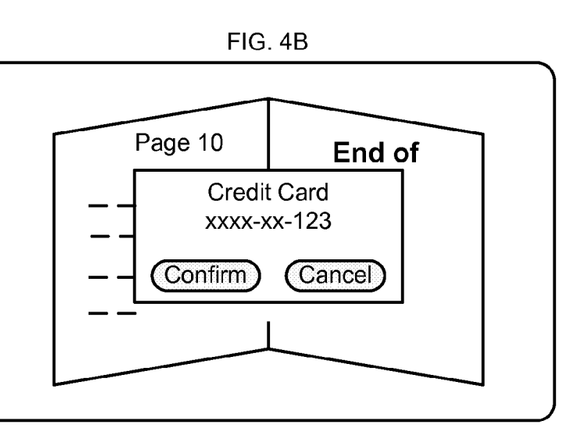
Figure 4C:
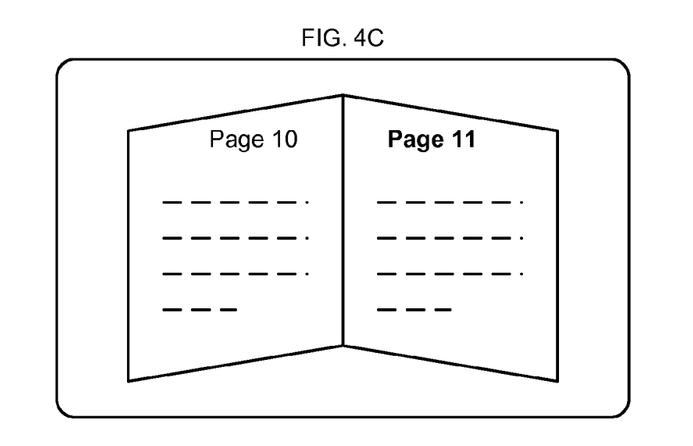
Figure 4D:
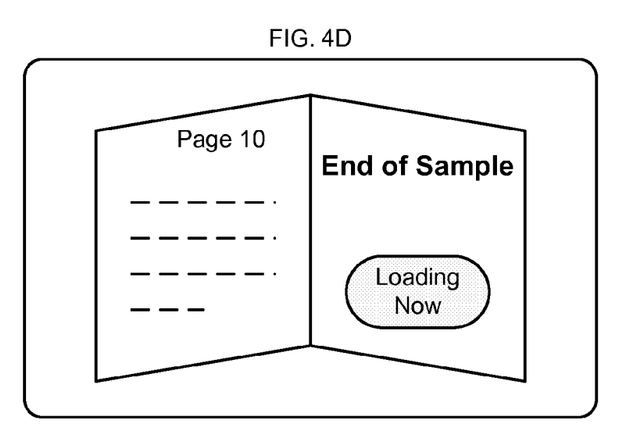

FIG. 4B illustrates the UI in the next stage, after the user has selected the buy button on the buy page. In FIG. 4B, a window is overlaid on the e-book text to collect purchase information from the user. FIG. 4C illustrates UI at the stage after the user has purchased the full version of the content. In FIG. 4C, the buy page is removed and the user is presented with additional e-book content. This content may be remaining sample content that is displayed while the full version of the content is downloaded to the client 110, or it may be content in the full version to which the user has been seamlessly transitioned. FIG. 4D, in contrast, illustrates the UI at a stage in which the user has exceed the scope of the sample content, and is presented with a loading page while the transition to the full content occurs.

Figure 5:
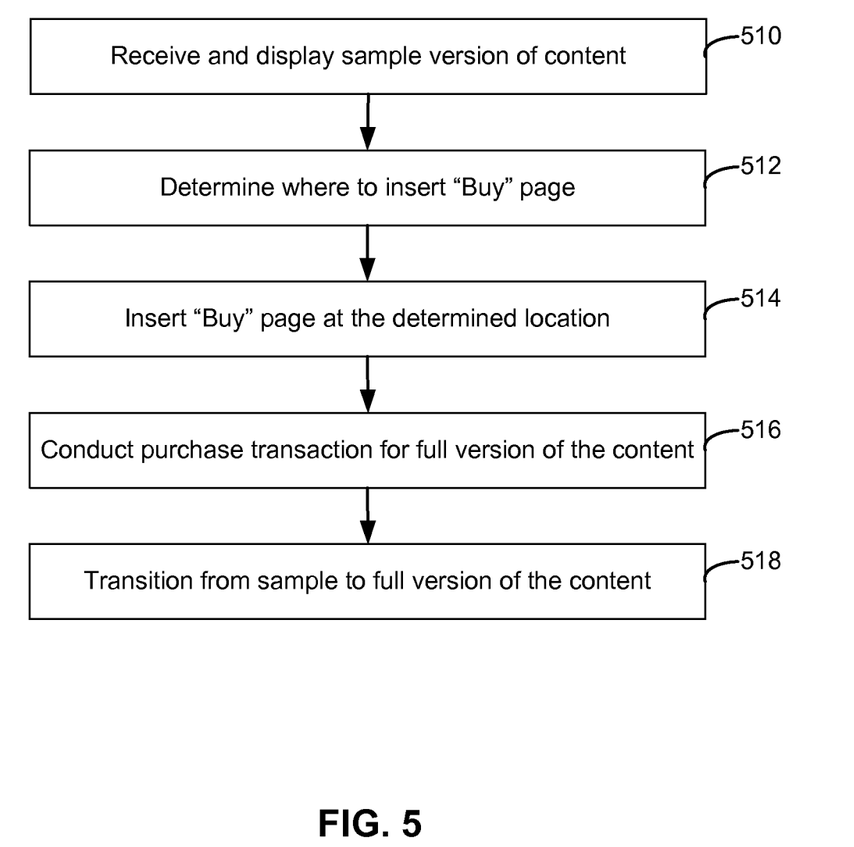
FIG. 5 is a flowchart illustrating steps performed by the client to seamlessly transition from a sample version of content to a full version of the content according to one embodiment.

FIG. 5 is a flowchart illustrating steps performed by the client 110 to seamlessly transition from a sample version of content to a full version of the content according to one embodiment. Other embodiments perform the illustrated steps in different orders, and/or perform different or additional steps. Moreover, some of the steps may be performed by entities other than the client 110.

Initially, the client 110 receives 510 and displays a sample version of content, such as an e-book retrieved from the store server 140. The sample version is a subset of the full version of the content. The client 110 determines 512 a location in the sample content in which to insert a buy page that allows the user to purchase the full version of the content. The buy page may be inserted at a location that minimizes the time the user spends waiting for the full version of the content to be installed on the client 110 should the user purchase the full version. In one embodiment, the client 110 uses locating factors such as the user's rate of consumption of the content, characteristics of the client, and characteristics of the content to determine the location. The client 110 inserts 514 the buy page at the determined location.

The user may interact with the buy page to purchase the full version of the content. In response, the client 110 interacts with the store server 140 to conduct 516 the purchase transaction. The client 110 then seamlessly transitions 518 the user from the sample to the full version of the content.

Figure 6:
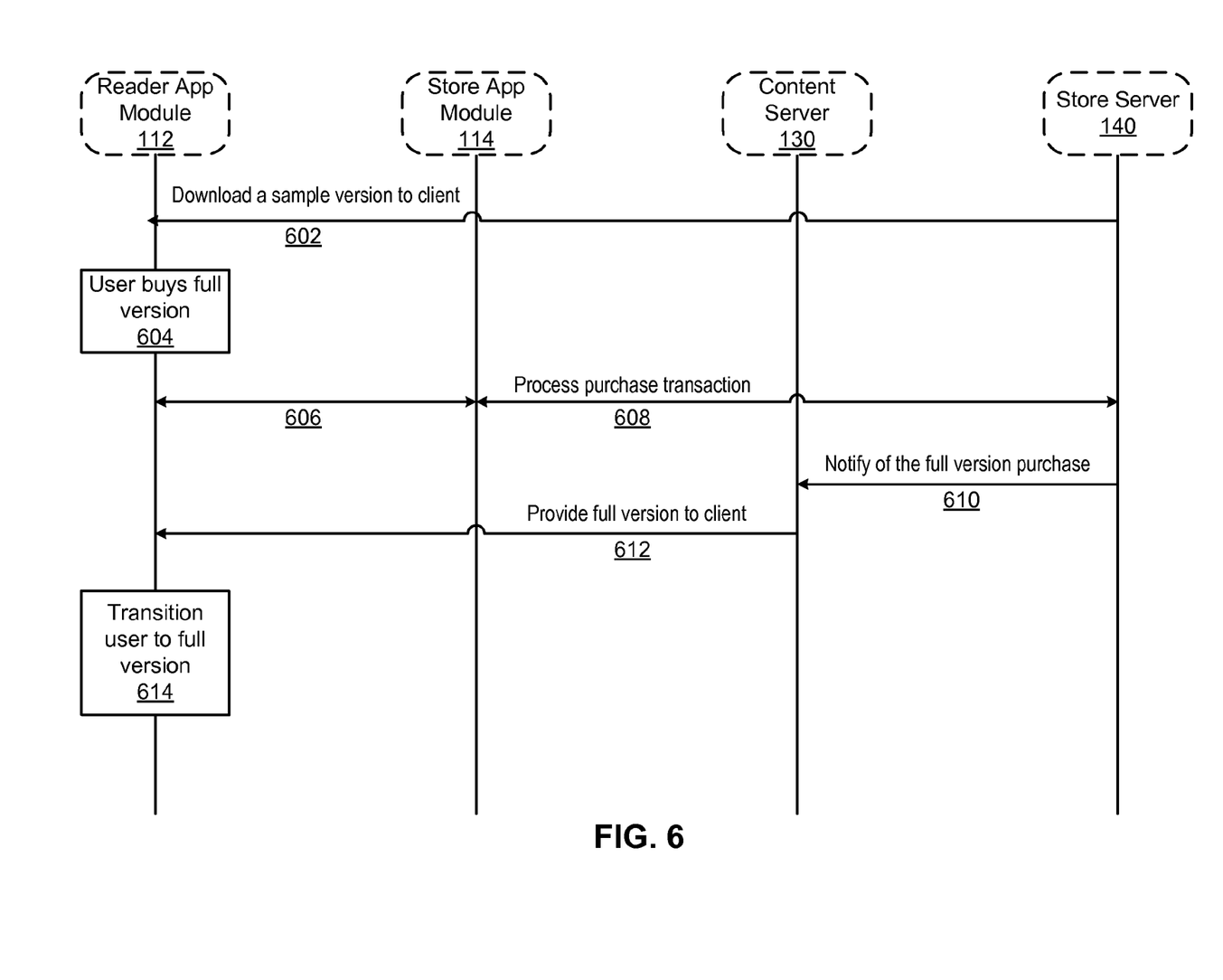
FIG. 6 is a diagram illustrating interactions among the reader application module, the store application module, the content server and the store server to effect a transition from a sample to a full version of content according to one embodiment.

FIG. 6 is a diagram illustrating interactions among the reader application module 112, the store application module 114, the content server 130 and the store server 140 to effect a transition from a sample to a full version of content according to one embodiment. The reader application module 112 initially downloads 602 the sample version of the content from the store server 140 and displays the sample to the user. The reader application module 112 inserts a buy page at a location in the sample version of the content. The user of the client 110 interacts 604 with the buy page to indicate a desire to purchase the full version of the content. In response, the reader application module 112 interacts 606 with the store application module 114 to process the purchase transaction. The store application module 114 communicates 608 in turn with the store server 140 to process the purchase transaction.

If the purchase is successful, in one embodiment the store server 140 notifies 610 the content server 130 of the purchase and causes the content server 130 to download 612 the full version of the content to the reader application module 112. The reader application module 112 receives the full version from the content server 130 and seamlessly transitions 614 the user from the sample version of the content to the full version.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of transitioning from a sample version of digital content to a full version of the content, comprising:
   displaying, by a processor, the sample version of the content to a user of a client, wherein the sample version of the content is a subset of the full version of the content;
   determining, by the processor, a location in the sample version of the content to insert a buy page, the user using the buy page to purchase the full version of the content, wherein determining the location in the sample version of the content to insert the buy page comprises:
      determining a consumption rate indicating a reading speed at which the user is consuming the sample version of the content;
      determining a download time indicating an amount of time to download the full version of the content from a content server to the client; and
      selecting the location for the buy page in the sample version of the content responsive to the consumption rate and the download time;
   inserting, by the processor, the buy page at the determined location in the sample version of the content; and
   responsive to the user purchasing the full version of the content, seamlessly transitioning, by the processor, from the sample version of the content to the full version of the content, the transitioning comprising:
      downloading the full version of the content from the content server;
      replacing the sample version of the content with the full version of the content in a content library; and
      displaying the full version of the content to the user, the displayed full version of the content starting from a same reading position in the sample version of the content that the user was consuming when the transition occurred,
      wherein the transitioning occurs without interruption in the user's reading experience.

2. The method of claim 1, wherein the full version of the digital content comprises an electronic book (e-book) having pages of text, the sample version of the content includes a subset of the text pages in the full version of the e-book, and the buy page is inserted as a page of the e-book at the determined location.

3. The method of claim 1, wherein selecting the location comprises selecting a location at which the full version of the content will be downloaded from the content server prior to the user consuming all of the sample version of the content.

4. The method of claim 1, wherein the selected location for the buy page is prior to an end of the sample version of the content and is determined based on a predetermined maximum amount of content to hold in reserve for the transition.

5. The method of claim 1, wherein inserting the buy page at the determined location comprises:
   dynamically generating the buy page, the generated buy page including user interface elements with which the user can interact to purchase the full version of the content; and
   displaying the generated buy page in the sample version of the content at the determined location.

6. A non-transitory computer-readable storage medium storing computer program instructions, executable by a processor, for transitioning from a sample version of digital content to a full version of the content, the computer program instructions comprising instructions for:
   displaying the sample version of the content to a user of a client, wherein the sample version of the content is a subset of the full version of the content;
   determining a location in the sample version of the content to insert a buy page, the user using the buy page to purchase the full version of the content, wherein the computer program instructions for determining the location in the sample version of the content to insert the buy page comprise instructions for:
      determining a consumption rate indicating a reading speed at which the user is consuming the sample version of the content;
      determining a download time indicating an amount of time to download the full version of the content from a content server to the client; and
      selecting the location for the buy page in the sample version of the content responsive to the consumption rate and the download time;
   inserting the buy page at the determined location in the sample version of the content; and
   responsive to the user purchasing the full version of the content, seamlessly transitioning from the sample version of the content to the full version of the content, the transition comprising:
      downloading the full version of the content from the content server;
      replacing the sample version of the content with the full version of the content in a content library; and
      displaying the full version of the content to the user, the displayed full version of the content starting from a same reading position in the sample version of the content that the user was consuming when the transition occurred,
      wherein the transitioning occurs without interruption in the user's reading experience.

7. The computer-readable storage medium of claim 6, wherein the full version of the digital content comprises an electronic book (e-book) having pages of text, the sample version of the content includes a subset of the text pages in the full version of the e-book, and the buy page is inserted as a page of the e-book at the determined location.

8. The computer-readable storage medium of claim 6, wherein the computer program instructions for selecting the location comprise instructions for selecting a location at which the full version of the content will be downloaded from the content server prior to the user consuming all of the sample version of the content.

9. The computer-readable storage medium of claim 6, wherein the selected location for the buy page is prior to an end of the sample version of the content and is determined based on a predetermined maximum amount of content to hold in reserve for the transition.

10. The computer-readable storage medium of claim 6, wherein the computer program instructions for inserting the buy page at the determined location comprise instructions for:
- dynamically generating the buy page, the generated buy page including user interface elements with which the user can interact to purchase the full version of the content; and
- displaying the generated buy page in the sample version of the content at the determined location.

11. A device for transitioning from a sample version of digital content to a full version of the content, the device comprising:
- a computer processor;
- a non-transitory computer-readable storage medium storing executable computer program instructions, the computer program instructions comprising instructions that, when executed, cause the computer processor to-display
  - the sample version of the content to a user of a client, wherein the sample version of the content is a subset of the full version of the content;
  - determining determine a location in the sample version of the content to insert a buy page, the user using the buy page to purchase the full version of the content, wherein the computer program instructions for determining the location in the sample version of the content to insert the buy page, comprise instructions that, when executed, cause the computer processor to:
    - determine a consumption rate indicating a reading speed at which the user is consuming the sample version of the content;
    - determine a download time indicating an amount of time to download the full version of the content from a content server to the client; and
    - select the location for the buy page in the sample version of the content responsive to the consumption rate and the download time;
  - insert the buy page at the determined location in the sample version of the content;
  - responsive to the user purchasing the full version of the content, seamlessly transition from the sample version of the content to the full version of the content, the transition comprising:
    - downloading the full version of the content from the content server;
    - replacing the sample version of the content with the full version of the content in a content library; and
    - displaying the full version of the content to the user, the displayed full version of the content starting from a same reading position in the sample version of the content that the user was consuming when the transition occurred,
  - wherein the transition occurs without interruption in the user's reading experience.

12. The device of claim 11, wherein the full version of the digital content comprises an electronic book (e-book) having pages of text, the sample version of the content includes a subset of the text pages in the full version of the e-book, and the buy page is inserted as a page of the e-book at the determined location.

13. The device of claim 11, wherein the computer program instructions for selecting the location comprise instructions that, when executed, cause the computer processor to select a location at which the full version of the content will be downloaded from the content server prior to the user consuming all of the sample version of the content.

14. The device of claim 11, wherein the computer program instructions for inserting the buy page at the determined comprise instructions that, when executed, cause the computer processor to:
- dynamically generate the buy page, the generated buy page including user interface elements with which the user can interact to purchase the full version of the content; and
- display the generated buy page in the sample version of the content at the determined location.

* * * * *